United States Patent
Sprouse et al.

(10) Patent No.: US 7,360,639 B2
(45) Date of Patent: Apr. 22, 2008

(54) HOT ROTARY SCREW PUMP

(75) Inventors: Kenneth M Sprouse, Northridge, CA (US); Albert E Stewart, Sylmar, CA (US)

(73) Assignee: Pratt & Whitney Rocketdyne, Inc., Canoga Park, CA (US)

( * ) Notice: Subject to any disclaimer, the term of this patent is extended or adjusted under 35 U.S.C. 154(b) by 848 days.

(21) Appl. No.: 10/869,644

(22) Filed: Jun. 16, 2004

(65) Prior Publication Data

US 2006/0045632 A1 Mar. 2, 2006

(51) Int. Cl.
*B65G 33/08* (2006.01)

(52) U.S. Cl. .................................. 198/658; 406/53

(58) Field of Classification Search ............... 198/658, 198/670, 671, 676; 406/53, 55, 61, 99
See application file for complete search history.

(56) References Cited

U.S. PATENT DOCUMENTS

| | | | |
|---|---|---|---|
| 1,258,911 A * | 3/1918 | Kinyon | 406/55 |
| 3,856,658 A | 12/1974 | Wolk et al. | |
| 4,138,162 A * | 2/1979 | Noren | 406/61 |
| 4,191,500 A | 3/1980 | Oberg et al. | |
| 4,197,092 A | 4/1980 | Bretz | |
| 4,391,561 A | 7/1983 | Smith et al. | |
| 4,488,838 A | 12/1984 | Herud | |
| 4,721,420 A | 1/1988 | Santhanam et al. | |
| 5,558,473 A | 9/1996 | Lindahl | |
| 5,718,539 A * | 2/1998 | Segota | 406/61 |
| 5,836,722 A * | 11/1998 | Lacchia | 406/122 |
| 6,053,667 A * | 4/2000 | Sakai et al. | 406/56 |
| 6,152,668 A | 11/2000 | Knoch | |
| 6,418,973 B1 | 7/2002 | Cox et al. | |
| 6,976,575 B2 * | 12/2005 | Koch et al. | 198/657 |
| 7,137,759 B1 * | 11/2006 | Ambs | 406/55 |

FOREIGN PATENT DOCUMENTS

JP          62235131 A   * 10/1987

* cited by examiner

*Primary Examiner*—Mark A. Deuble
(74) *Attorney, Agent, or Firm*—Carlson, Gaskey & Olds

(57) ABSTRACT

A screw feeder can be used to transport a high temperature particulate material. A housing contains the material within the screw feeder which includes an inlet and an outlet port. A screw is rotatably positioned within the housing to advance the material from the inlet port to the outlet port, which rotates axially. A labyrinth seal can be formed around and in communication with the screw to eliminate reverse movement of the material. A cooling medium can be directed into contact with at least the housing. A fluid can be injected through the screw to prevent blockage of the particulate material. A pressure differential is created from the inlet to the outlet port of at least 0.069 MPad.

34 Claims, 4 Drawing Sheets

US 7,360,639 B2

HOT ROTARY SCREW PUMP

FIELD OF THE INVENTION

The present invention relates in general to hydrogen generation by steam reforming of natural gas and more specifically to a device and method for pumping solid materials used in such a reforming process.

BACKGROUND OF THE INVENTION

The generation of hydrogen from natural gas via steam reforming is a well established commercial process. One drawback is that commercial units tend to be extremely large in volume and subject to significant amounts of methane slip, identified as methane feedstock which passes through the reformer un-reacted.

To reduce the size and increase conversion efficiency of the units, a process has been developed which uses calcium oxide to improve hydrogen yield by removing carbon dioxide generated in the reforming process. See U.S. patent application Ser. No. 10/271,406 entitled "HYDROGEN GENERATION APPARATUS AND METHOD", filed Oct. 15, 2002, commonly owned by the assignee of the present invention, the disclosure of which is incorporated herein by reference. The calcium oxide reacts with the $CO_2$ in a separation reaction, producing a solid calcium carbonate ($CaCO_3$) and absorbing the $CO_2$.

Limitations on the calcium carbonate reuse process include that as the calcium carbonate, in either $CaCO_3$ or CaO (solid) forms are circulated, both pumping and metering are required at the inlets to the hydrogen generator and a calcination reactor (where the $CO_2$ is removed). Accurate metering of this high temperature granular material while pumping it into higher pressure regions has commonly been performed using very tall stand pipes and riser systems (such as developed by KBR Inc. of Houston, Tex.). These stand pipe transfer systems are large, some exceeding 15.24 m (50 ft) in height, and do not provide for downstream solids flow splitting required for the calcination reactor. With the large size of these units, gas leakage from or into the system is also an issue.

SUMMARY OF THE INVENTION

According to a preferred embodiment of the present invention, a screw feeder to transport a particulate material from a low pressure to a high pressure environment includes a housing to contain the material while it is within the screw feeder. The housing includes an inlet port to receive the particulate material and an outlet port to allow the particulate material to exit the housing. A screw is rotatably mounted within the housing to advance the particulate material from the inlet port to the outlet port. A jet port is disposed in the screw, the jet port operably assisting in moving the particulate material to the outlet port. A material of the screw is selected from one of a high temperature compatible metal and a ceramic material.

In another preferred embodiment of the present invention, a screw feeder to transport a particulate material from a low pressure to a high pressure environment includes a housing to contain the material while it is within the screw feeder. The housing defines an inlet port and an outlet port. A screw is rotatably disposed within the housing to advance the material from the inlet port to the outlet port, and adapted to rotate axially. A labyrinth seal is formed around and in communication with the screw to substantially eliminate reverse movement of the material. A cooling medium is in operable contact with at least the housing. A pressure differential from the inlet port to the outlet port is at least 0.069 MPad (10 psia).

In still another preferred embodiment of the present invention, a method for transporting a high temperature particulate material using a screw pump, the screw pump including a screw, and a housing, includes: rotatably mounting the screw within the housing; feeding the particulate material at an elevated temperature into the housing to operably contact the screw; axially rotating the screw to operably advance the particulate material; creating a labyrinth seal around and in communication with the screw to substantially eliminate reverse movement of the material; cooling at least the housing; and generating a differential pressure across the screw pump of at least 0.069 MPad (10 psia).

Advantages of the present invention include a screw pump having materials compatible with a high temperature particulate material, operable to transfer the particulate material by axial rotation of a screw. A fluid source can be connected to a jet of the screw to reduce clogging of the particulate material in the screw. A cooling source can be connected to the screw pump to cool portions of the screw pump not directly exposed to the elevated temperature of the particulate material.

The features, functions, and advantages can be achieved independently in various embodiments of the present invention or may be combined in yet other embodiments.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
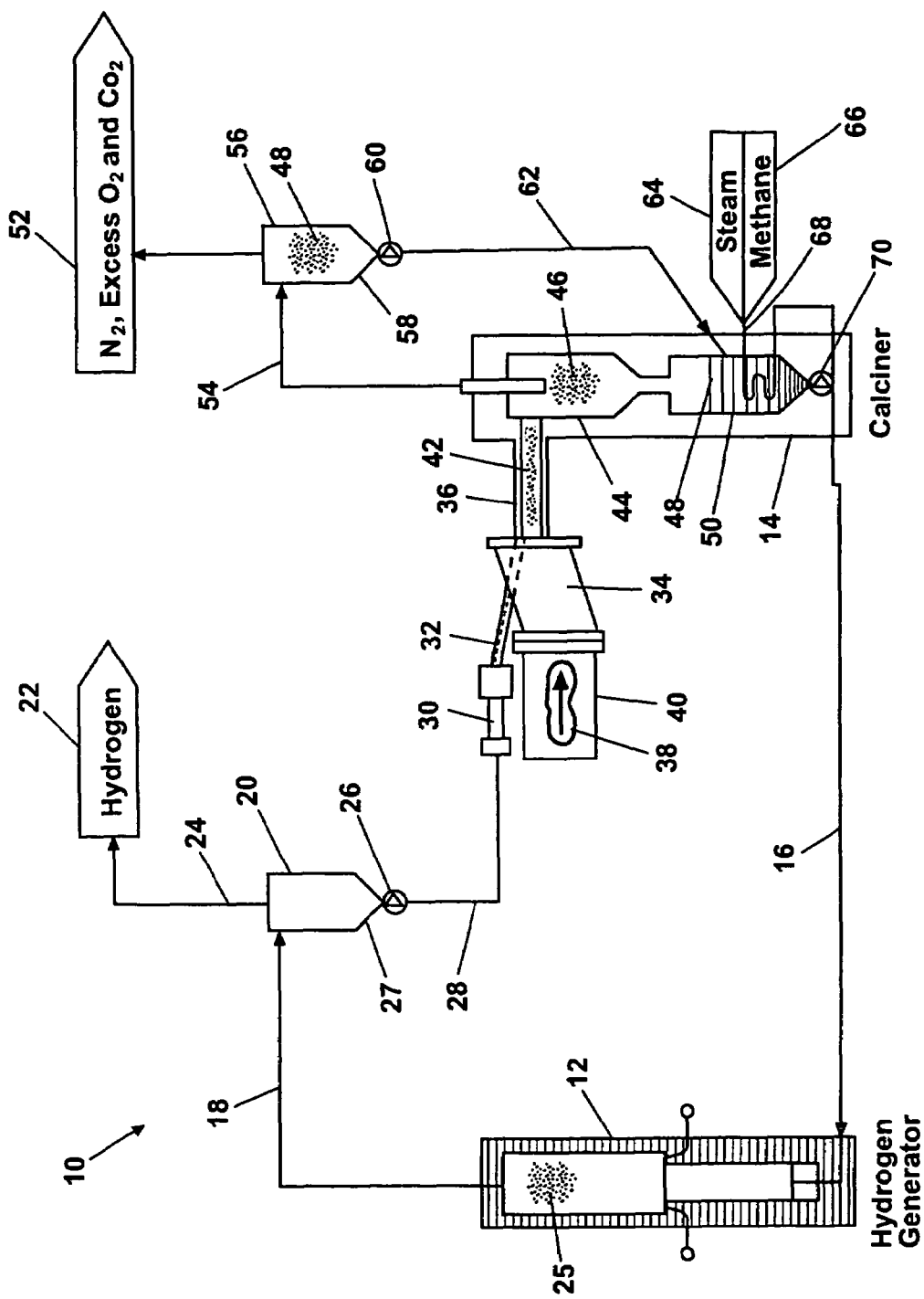
FIG. 1 is a diagram of a reformation system having a plurality of hot rotary screw pumps according to a preferred embodiment of the present invention.

Referring generally to FIG. 1, according to a preferred embodiment of the present invention, a reformation system 10 can include a hydrogen generator 12 which receives reaction products from a calciner 14 via a generator feed line 16. Discharge from the hydrogen generator 12 can be provided via a generator discharge line 18 to a hydrogen cyclone separator 20. Hydrogen gas 22 is largely removed from hydrogen cyclone separator 20 via a hydrogen discharge line 24. A plurality of calcium carbonate ($CaCO_3$) particles 25, which are entrained in a flow that can contain hydrogen, steam and nitrogen gases from hydrogen generator 12, can be separated and collected for discharge at a discharge end 27 of hydrogen cyclone separator 20. The calcium carbonate particles 25 are transferred via a hot rotary screw pump (hereinafter screw pump) 26 of the present invention via a return line 28 back to calciner 14.

In return line 28 a flow splitter 30 can be disposed having at least one feed tube 32 discharging the calcium carbonate particles 25 into a calciner injector 34. An exemplary calciner injector 34 is disclosed in United States patent application entitled "DRY, LOW NITROUS OXIDE CALCINER INJECTOR, concurrently filed herewith, commonly assigned to the assignee of the present invention, the disclosure of which is incorporated herein by reference. Calciner injector 34 can be connected to a calciner inlet 36 of calciner 14. A hot, vitiated air volume 38 can be introduced via a vitiated air generator 40 into calciner injector 34. Details of vitiated air generator 40 are provided in U.S. patent application entitled "NON-SWIRL DRY LOW NOx (DLN) COMBUSTOR" filed Feb. 26, 2004, commonly owned by the present invention, the disclosure of which is incorporated herein by reference.

Calciner inlet 36 can receive a mixture 42 including the calcium carbonate particles 25 and the hot vitiated air volume 38 discharged into calciner inlet 36 upstream of a cyclone separator 44 within calciner 14. Regeneration of the calcium carbonate particles 25 back to calcium oxide occurs primarily within calciner inlet 36. As a result of the regeneration process, as well as the addition of steam and methane as noted below, a calcium oxide/nitrogen/carbon dioxide/oxygen mixture 46 can be created within cyclone separator 44. A plurality of relatively heavier calcium oxide particles 48 can be separated within cyclone separator 44 and fall into a hopper 50 within calciner 14. A gas volume 52 that can contain nitrogen, excess oxygen and carbon dioxide gases, together with a small carryover volume of calcium oxide particles 48, can be discharged from cyclone separator 44 via a gas discharge line 54 to a cyclone separator 56. Gas volume 52 can be discharged from cyclone separator 56, leaving the carryover volume of calcium oxide particles 48 to collect in a bottom hopper area 58 of cyclone separator 56. A screw pump 60 can return the carryover volume of calcium oxide particles 48 via a calciner input line 62 to hopper 50 of calciner 14. A steam supply 64 and a methane supply 66 can be connected to calciner 14 and a steam/methane mixture 68 together with the regenerated calcium oxide particles 48 can be transferred via a screw pump 70 to hydrogen generator 12 to repeat the process.

During operation of reformation system 10, hydrogen generator 12 reacts steam from steam supply 64 and methane from methane supply 66 to generate hydrogen and carbon dioxide. The carbon dioxide is removed from hydrogen generator 12 by reaction with the calcium oxide particles 48 entrained with steam/methane mixture 68. The hydrogen 22 is removed via hydrogen cyclone separator 20 as previously discussed. As the calcium oxide particles 48 absorb the carbon dioxide, calcium carbonate particles 25 are formed which are transferred by screw pump 26 in particulate form out of hydrogen cyclone separator 20, as previously discussed, and into calciner injector 34. Hot, vitiated air volume 38 can impinge and react with the calcium carbonate particles 25 in calciner inlet 36 to reform calcium oxide particles 48 from mixture 42, which subsequently enter cyclone separator 44 of calciner 14. Within calciner 14, the calcium oxide particles 48 can be separated from mixture 46. During operation of reformation system 10, calcium carbonate particles 25 are continuously reformed to calcium oxide particles 48 and calcium oxide particles 48 are returned in particulate form with steam/methane mixture 68 using screw pump 70 to hydrogen generator 12.

In one embodiment, system conditions adjacent each of the screw pumps 26, 60 and 70 are approximately as follows:
 a) Screw pump 26 inlet: pressure approximately 0.793 MPa (115 psia), temperature approximately 649° C. (1200° F.);
 b) Screw pump 26 outlet: pressure approximately 0.931 MPa (135 psia), temperature approximately 649° C. (1200° F.);
 c) Screw pump 60 inlet: pressure approximately 0.655 MPa (95 psia), temperature of calcium oxide particles approximately 982° C. (1800° F.);
 d) Screw pump 60 outlet: pressure approximately 0.793 MPa (115 psia), temperature of calcium-oxide-particles approximately 982° C. (1800° F.);
 e) Screw pump 70 inlet: pressure approximately 0.793 MPa (115 psia), temperature of calcium oxide particles approximately 760° C. (1400° F.); and
 f) Screw pump 70 outlet: pressure approximately 0.931 MPa (135 psia), temperature of calcium oxide particles approximately 760° C. (1400° F.).

Referring generally to FIGS. 2 through 5, an exemplary one (screw pump 26) of screw pumps 26, 60 and 70 used in reformation system 10 is shown in greater detail. Screw pumps 60 and 70 are similar in design to screw pump 26 but can operate at different temperatures and/or pressures as discussed above. Any of screw pumps 26, 60 or 70 generate approximately a 0.138 MPad (20 psid) pressure differential between the screw pump inlet to the outlet. This pressure differential can vary between a low of about 0.069 MPad (10 psid) to a high of about 0.689 MPad (100 psid) differential. Screw pumps 26, 60 and 70 use one or more components of one or more ceramic matrix composite (CMC) materials. CMC material for the various component parts of hot rotary screw pumps 26, 60 and 70 of the present invention is disclosed in U.S. Pat. No. 6,418,973, to Cox et al., issued Jul. 16, 2002, commonly assigned to the assignee of the present invention, the disclosure of which is incorporated herein by reference.

Screw pump 26 can receive a mixture of hydrogen, steam, oxygen and nitrogen gases with the calcium carbonate particles 25 at discharge end 27 of hydrogen cyclone separator 20. The gas mixture and calcium carbonate particles 25 at discharge end 27 is fed into an inlet end 72 of a screw barrel 74. The inlet end 72 of screw barrel 74 includes a feed sleeve 76. The remainder of inlet end 72 of screw barrel 74 is defined by a stationary sleeve 78 which substantially surrounds and seals the remainder of inlet end 72. Turning within screw barrel 74 is a screw 80 generally including a central shaft 82 and a screw thread 84 surrounding central shaft 82. Between each turn of screw thread 84 is defined a threaded space 86 where material is held and moved. The calcium carbonate particles 25 entrained in the hydrogen/steam/nitrogen stream from discharge end 27 are driven from inlet end 72 to a high pressure end 88 where the calcium carbonate particles 25 and the hydrogen/steam/nitrogen stream are discharged via a conduit 90 into return line 28 via a fitting 92. The pressure at high pressure end 88 is higher by approximately 0.138 MPad (20 psid) than the pressure at inlet end 72.

Screw 80 is rotated through an interconnection of a screw gear 94 and a drive gear 96. Drive gear 96 is driven by a drive motor 98. The drive motor 98 may be any appropriate motor that may be powered by electricity or other fuels. An interconnecting gear 100 allows the direction of rotation of drive gear 96 to be the same as the screw gear 94. Drive motor 98 also drives a second or sleeve drive gear 102 which interconnects with splines formed on the exterior of a rotating sleeve 104. Drive motor 98 therefore directly drives rotating sleeve 104 while it drives screw 80 with interconnecting gear 100. Therefore, screw 80 rotates in a direction opposite the angular rotation of rotating sleeve 104. When geared correctly, this allows screw 80 to rotate substantially freely relative to rotating sleeve 104 even if screw 80 interacts with rotating sleeve 104, as discussed further herein.

Near inlet end 72 is a fluid delivery mechanism 106. Fluid delivery mechanism 106 delivers a fluid such as $CO_2$ gas or steam through a fluid feed line 108 from a fluid supply 110. The fluid from fluid supply 110 is used to increase the pressure differential across screw pump 26 of calcium carbonate particles 25, while reducing the transfer/loss of hydrogen through screw pump 26. The fluid from fluid supply 110 may be any suitable fluid, but in one form for application to screw pump 26 includes gaseous $CO_2$. Fluid feed line 108 enters a housing 112 through a sealant nipple 114. Within housing 112 is defined a sealed space 116 which is defined by housing 112 and a seal 118. Once the fluid fills sealed space 116, it is forced down a bore 120 defined within central shaft 82 of screw 80. Although bore 120 is defined substantially as the center of central shaft 82, it will be understood that bore 120 may be positioned radially on central shaft 82. Bore 120 allows the fluid from fluid supply 110 to be provided to any portion of screw 80. It will be understood that bore 120 may be defined along an entire length of central shaft 82 or may only be defined to a stopping point 122 to limit the volume of fluid required to fill bore 120.

Also formed within housing 112 is a first or first shaft bearing 124. First shaft bearing 124 allows central shaft 82 to rotate substantially freely. In addition, seal 118 allows central shaft 82 to also rotate within seal 118 while maintaining sealed space 116.

Between housing 112 and screw gear 94 there does not need to be a substantial seal. Although it may be desired to include tight tolerances to ensure a smooth operation of screw pump 26, there is no leakage of either calcium carbonate particles 25 or hydrogen/steam/nitrogen from discharge end 27 or fluid from housing 112 which may occur between housing 112 and screw gear 94. It may be desirable, however, to provide a very tight tolerance or seal to seal discharge end 27 with screw barrel 74 of screw pump 26. Either tight tolerances or a seal 126 may be provided between appropriate portions of the discharge end 27 and screw barrel 74. It will also be understood that although discharge end 27 is illustrated to be in contact with both rotating sleeve 104 and screw gear 94, it does not necessarily need to be in contact with these moving parts. It will also be understood that appropriate designs may be included in the present invention which provide that discharge end 27 be in contact with stationary portions of screw pump 26 and provide a seal therebetween. In addition, the areas between stationary sleeve 78 and both screw gear 94 and rotating sleeve 104 are also sealed with an appropriate high temperature seal member 128, acceptable for use at an operating temperature of at least 982° C. (1800° F.). Therefore, material fed into inlet end 72 of screw barrel 74 is not able to freely pass through screw barrel 74 and escape along screw 80 to possibly interfere with the mechanism of screw pump 26. Any such material is kept within screw barrel 74 itself.

Surrounding high pressure end 88 and rotating sleeve 104 is a body 130. Body 130 is generally immobile relative to rotating sleeve 104. Therefore, a first sleeve bearing 132 and a second sleeve bearing 134 are provided to allow a substantially easy rotation of rotating sleeve 104 relative to body 130. Also, a seal member 136 is provided between rotating sleeve 104 and high pressure conduit 90. This is because high pressure conduit 90 is at a pressure higher than the area surrounding rotating sleeve 104, which may be sealed or open to ambient conditions. Therefore, to reduce the possibility or eliminate material blow back into other areas of screw pump 26, seal member 136 is provided. Seal member 136 is adapted to allow substantially free rotation of rotating sleeve 104 regardless of the presence of seal member 136. In addition, a second shaft bearing 138 is provided to receive a second end of central shaft 82. Therefore, first shaft bearing 124 and second shaft bearing 138 substantially hold central shaft 82 in a selected position while allowing its substantially free rotation powered by drive motor 98.

The calcium carbonate particles 25 entrained within the hydrogen/steam/nitrogen stream from discharge end 27 of hydrogen cyclone separator 20 is moved from inlet end 72 to high pressure end 88 by the motion of screw thread 84 of screw 80. As screw 80 rotates, the motion of screw thread 84 moves the calcium carbonate particles 25 entrained within the hydrogen/steam/nitrogen stream from inlet end 72 to high pressure end 88 because screw 80 remains stationary. As the calcium carbonate particles 25 entrained within the hydrogen/steam/nitrogen stream moves from inlet end 72 to high pressure end 88, compressive forces at the interfaces of touching calcium carbonate particles 25 are increased along with the gas density within the interstices of calcium carbonate particles 25.

Without adding additional fluid into a threaded space 86, increased fluid density would develop by back-flowing high pressure fluid from high pressure conduit 90 into threaded space 86. This back flowing fluid further increases the compressive forces acting at the interfaces of the touching calcium carbonate particles 25. Eventually, these interface compressive forces will stop the flow of calcium carbonate particles 25 through screw pump 26. If this were to occur, screw 80 and the compacted calcium carbonate particles 25 would simply rotate as a solid cylinder rather than moving from inlet end 72 and ejecting out high pressure end 88.

Figure 3:
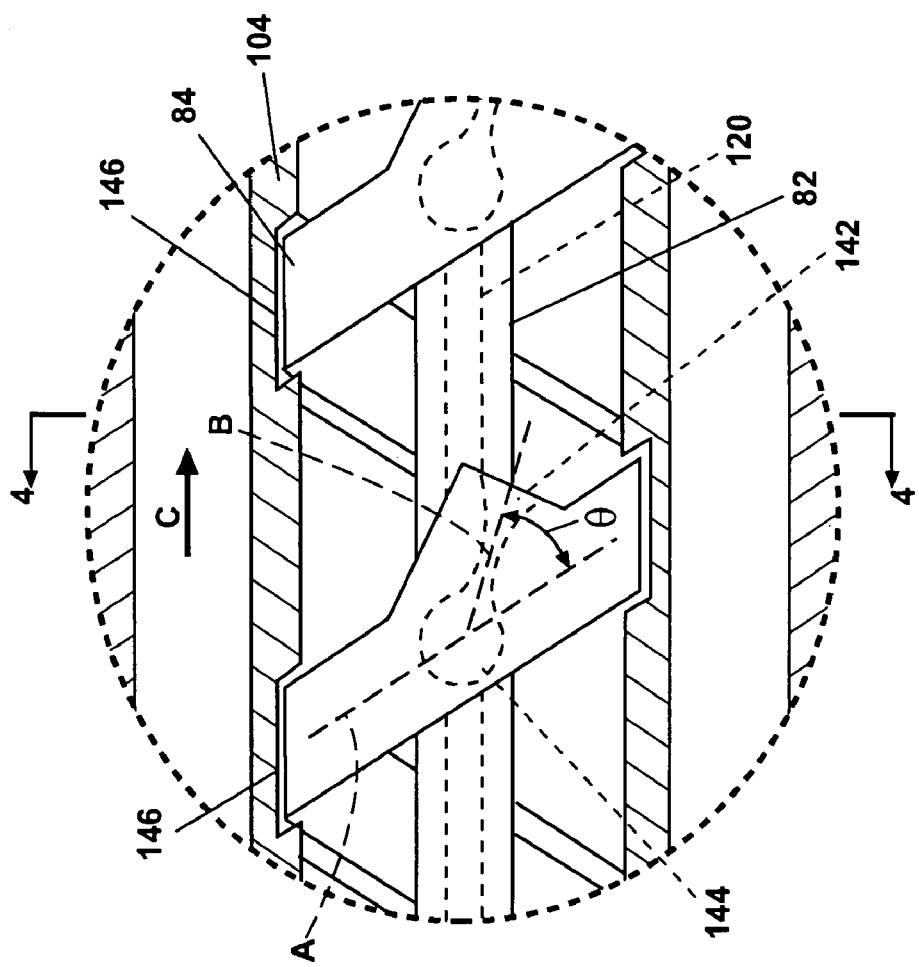
FIG. 3 is a cross sectional elevation view taken at area 3 of FIG. 2.
Figure 4:
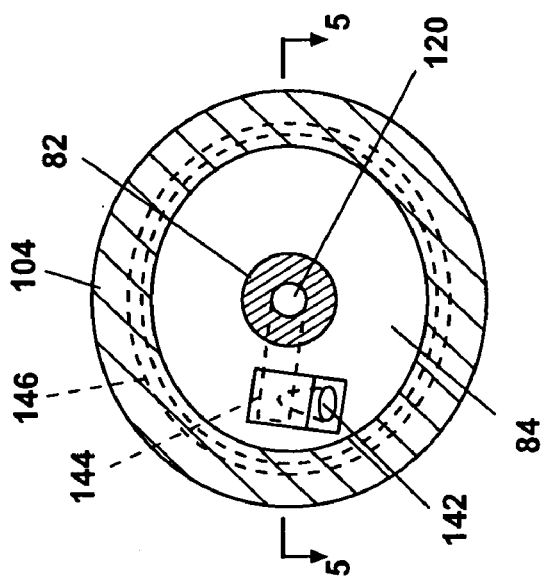
FIG. 4 is a cross sectional view taken at section 4-4 of FIG. 3.
Figure 5:
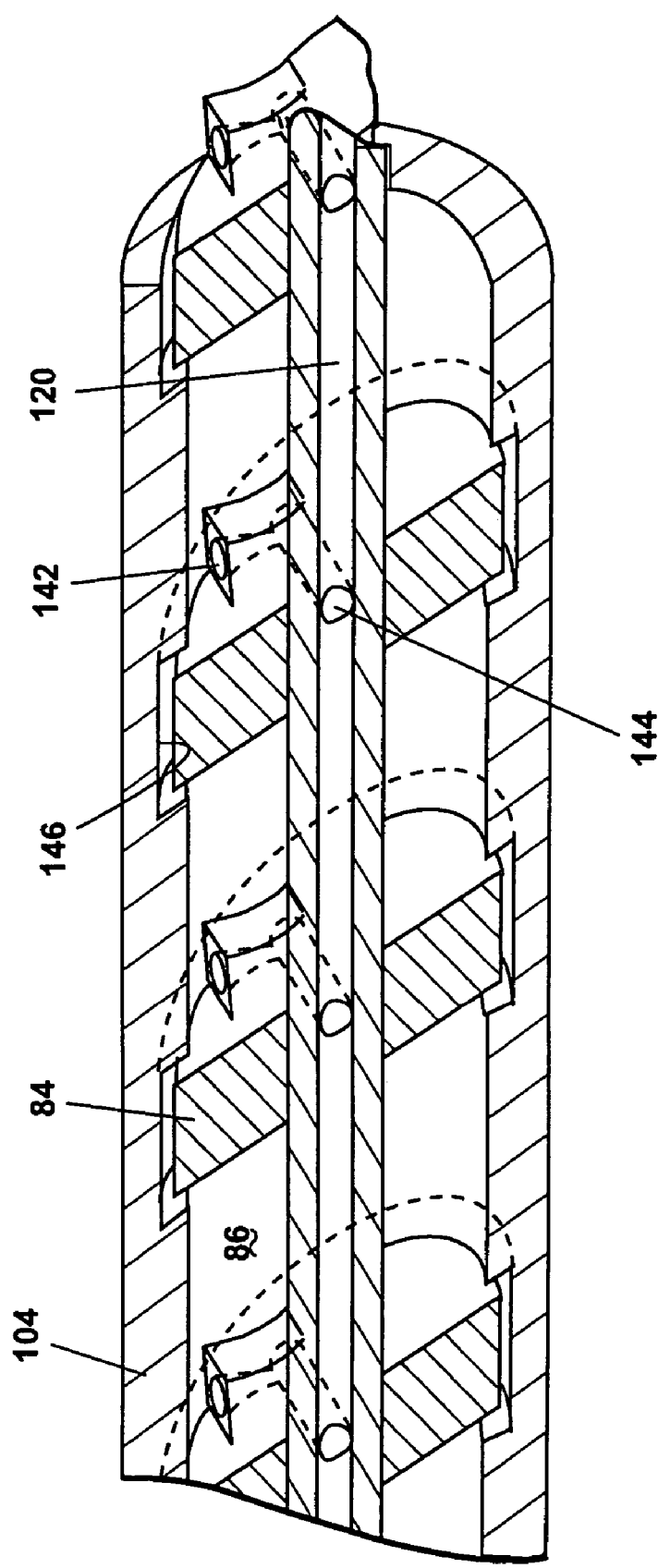
FIG. 5 is a cross sectional view taken at section 5-5 of FIG. 4.

To minimize the possibility of the calcium carbonate particles 25 being compacted by compressive forces into a single solid plug, central shaft 82 defines bore 120 through which a fluid may be pumped. The fluid from fluid supply 110 is provided to bore 120. With reference to FIGS. 3 and 4, the fluid provided through bore 120 is then ejected out a fluid nozzle 142 formed in individual screw threads 84 of screw 80. The screw threads 84 each define a plane "A". Fluid nozzle 142 is formed about a central axis "B" and central axis "B" is formed at an angle θ from plane "A" of screw thread 84. Angle θ may be any appropriate angle to move the material along rotating sleeve 104 but is generally about 15° to about 30°. The angle θ is generally acute relative to the direction of rotation of screw 80. The fluid is provided within bore 120 at a pressure higher than screw pump 26 discharge pressure. Although the pressure may be regulated and selected, if screw pump 26 is included in reformation system 10, the pressure provided to bore 120 is preferably approximately 1.586 MPa (230 psia). Therefore, the fluid would flow through bore 120 into a nozzle bore 144 and be ejected out of fluid nozzle 142.

The rotating sleeve 104 includes a female notch groove 146 to receive screw thread 84 of screw 80. The female notch groove 146 may be formed in rotating sleeve 104 to substantially cooperate with the helical shape of screw thread 84. Therefore, as rotating sleeve 104 rotates in a first direction, and screw thread 84 of screw 80 rotates in a second direction, screw 80 is able to rotate freely within rotating sleeve 104. This provides a labyrinth seal between screw 80 and rotating sleeve 104. Therefore, the material provided in threaded spaces 86 and the fluid ejected out of fluid nozzle 142 is not able to move towards inlet end 72 of tube 126, but rather is always directed towards high pressure end 88 due to the motion of screw 80.

As best seen in FIG. 3, the angle θ of fluid nozzle 142 relative to plane "A" of screw thread 84 allows for a substantially continuous directional movement of the calcium carbonate particles 25 within the threaded spaces 86. Each fluid nozzle 142 is generally aimed in the rotational (material transport) direction "C" of screw thread 84. Therefore, the jet of fluid being emitted by fluid nozzle 142 substantially forces the calcium carbonate particles 25 in the threaded spaces 86 towards high pressure end 88. Not only does the fluid emitted from fluid nozzle 142 provide additional momentum to the calcium carbonate particles 25 within threaded spaces 86 to ensure that the material does not agglomerate or become a solid mass, but the fluid ejected from fluid nozzle 142 also helps counteract the compressive forces within the calcium carbonate particles 25. Because the calcium carbonate particles 25 include fluids (including, but not limited to steam/nitrogen/oxygen/carbon dioxide/hydrogen gases) in the interstitial spaces, between the individual particles of the calcium carbonate particles 25 these fluids become compressed as the calcium carbonate particles 25 are forced toward outlet 138. Therefore, the inclusion of a volume of fluid ejected through fluid nozzle 142 accommodates the compression of the initial volume of interstitial fluid by providing a make-up volume of fluid. Even though the calcium carbonate particles 25 are moved towards a higher pressure head, the introduction of additional fluid through fluid nozzle 142 allows the compression of the original interstitial fluids.

Although the rotational speed of screw 80 may depend upon the material from which screw 80 is formed, it may generally be formed of a CMC material. A preferable CMC material includes a matrix formed of a silicon carbide and a fiber formed of either a carbon or a silicon carbide material. CMC material is also preferably used for central shaft 82. It will also be understood, however, that screw 80 and central shaft 82 may be formed of other appropriate materials such as a high temperature compatible metal (including metal alloys), defined as a metal or metal alloy adaptable for use at or above a temperature of approximately 538° C. (1000° F.) and up to a temperature of at least 982° C. (1800° F.). CMC or high temperature compatible metal or metal alloy material can also be used for many of the high temperature parts of the screw pump of the present invention, including the bearing balls and races of first and second sleeve bearings 132, 134, and first and second shaft bearings 124, 138. Screw 80 is sized to maintain its angular tip speed at about 61 m/sec (200 ft/sec) using rotational speeds between 3,600 and 20,000 rpm. When calcium carbonate particles 25 are the material being moved with screw 80, keeping the angular tip speed of screw 80 at about 61 m/sec or less, together with the use of silicon carbide in the CMC material, ensures that no substantial erosion or corrosion of screw 80 occurs. Furthermore, screw 80 may be any appropriate diameter, but is generally about 2.54 cm to about 12.7 cm (one inch to about five inches) in diameter. This provides the ability to move up to 50 kg/sec (4,760 tons per day) out high pressure side 138.

The fluid (for example $CO_2$) generally exits fluid nozzles 142 above sonic speed in a range of about mach 3.0 or more. This provides a substantial force against the calcium carbonate particles 25 becoming fixed in any one position within threaded space 86. Therefore, the material is free to be forced along by the rotational movement of screw 80 towards high pressure end 88. It will be understood that screw pumps 26, 60 or 70 may also be used to pressurize other solid materials besides calcium carbonate or calcium oxide.

Figure 2:
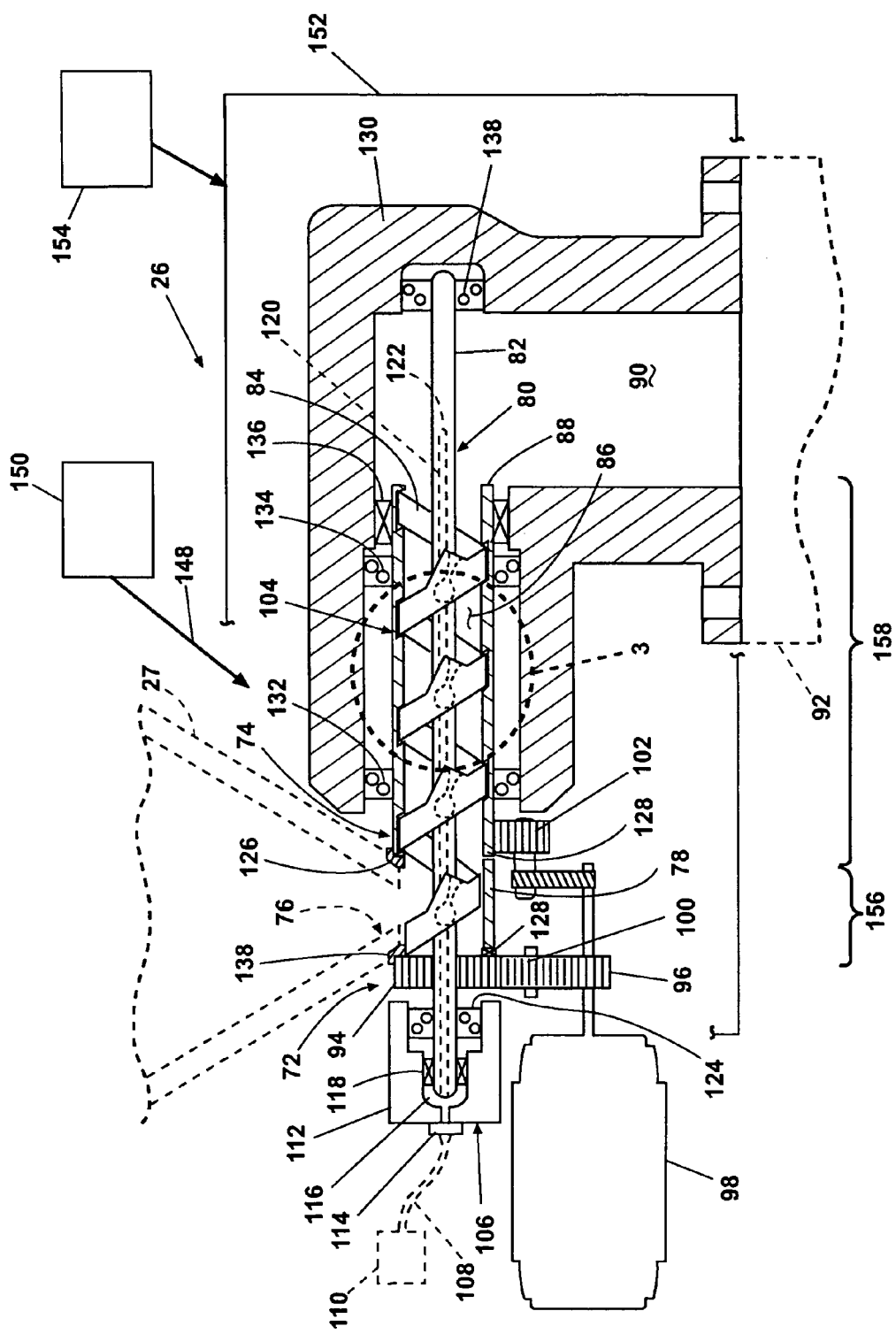
FIG. 2 is an elevational cross sectional view of a hot rotary screw pump of the present invention.

Referring back to FIG. 2, due to the elevated temperature range that a screw pump of the present invention operates within, approximately 538° C. to approximately 982° C. (1000° F. to approximately 1800° F.), additional or forced cooling can also be provided. FIG. 2 identifies two possible types of external cooling, although it should be recognized that alternate forms of cooling known in the art can be used. A flow of cooling air 148, provided from a cooling air source 150 can be directed toward the screw pump. A cooling jacket 152 (only partially shown) can be constructed to surround selected components such as body 130. A cooling fluid such as steam or similar cooling fluid can be directed into cooling jacket 152 from a cooling fluid source 154. Cooling flow can also be directed to ports and/or channels (not shown) formed within body 130. A first or low pressure end 156 of screw pump 26 is substantially bounded by stationary sleeve 78. A second or high pressure end 158 of screw pump 26 substantially includes rotating sleeve 104 and conduit 90 of body 130.

Referring back to FIGS. 1 and 2, because $CO_2$ is actively being removed adjacent the locations of screw pump 60 and/or 70 of reformation system 10, an alternate injection fluid is desirable for screw pump 60 and/or 70. Fluid supplied by fluid supply 110 can be steam for the application of screw pump 60 and/or 70 to eliminate further injection of $CO_2$ at these locations and to advantageously use the steam available from steam supply 64. Other fluids including air or other gases can be supplied by fluid supply 110.

A screw pump of the present invention provides several advantages. By enclosing a rotatable screw within a sleeve of the present invention, the screw can advance a particulate material. By using a high temperature compatible metal or ceramic material for the screw and/or the sleeve, the particulate material transferred by a rotatable screw of the present invention can be at elevated temperature, for example at a temperature ranging from about 538° C. to about 982° C., suitable for transporting calcium carbonate particles used in a hydrogen reformation process such as reformation system 10. By providing for a cooling medium, a rotatable screw of the present invention can also use lower temperature materials for components not directly exposed to the elevated temperature of the particulate material. By injecting a fluid into the flow stream of the screw and particulate material, blockages of the particulate material can be reduced or eliminated.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A screw feeder to transport a particulate material from a low pressure to a high pressure environment, the screw feeder comprising:

a housing to contain the material while it is within the screw feeder, the housing including an inlet port to receive the particulate material and an outlet port to allow the particulate material to exit the housing;

a screw rotatably mounted within the housing to advance the particulate material from the inlet port to the outlet port;

a jet port disposed in the screw, the jet port operably assisting in moving the particulate material to the outlet port; and a cooling medium envelope operable to permit a cooling medium to contact at least the housing;

wherein a material of the screw is selected from one of a high temperature compatible metal and a ceramic material.

2. The screw feeder of claim 1, wherein the high temperature compatible material is adaptable for use at a temperature of at least 538° C.

3. The screw feeder of claim 1, further comprising:

a stationary sleeve substantially surrounding a first end of the screw defining a low pressure end of the screw feeder;

a motor; and a screw gear operably interconnecting the motor and the screw to rotate the screw within the stationary sleeve.

4. The screw feeder of claim 3, comprising:

a rotatable sleeve substantially surrounding a second end of the screw defining a high pressure end of the screw feeder; and a sleeve gear operably interconnecting the motor and the rotatable sleeve;

wherein the screw gear operably drives the screw in a first rotation direction and the sleeve gear operably drives the rotatable sleeve in a second rotation direction.

5. The screw feeder of claim 4, wherein the rotatable sleeve includes an interior and an exterior, the interior defining a groove;

wherein the screw substantially engages the groove; and wherein the rotatable sleeve and the screw rotate in substantially opposite rotational directions.

6. The screw feeder of claim 5, wherein when the screw substantially engages the groove a seal is operably formed between the screw and the groove.

7. The screw feeder of claim 6, wherein the seal is operably formed as a tight clearance seal.

8. The screw feeder of claim 4, wherein at least the screw, the stationary sleeve and the rotatable sleeve each comprise a ceramic matrix composite material.

9. The screw feeder of claim 1, wherein the screw defines an axial bore, and the screw further defines a radial bore, wherein the radial bore operably interconnects the axial bore and the jet port, such that a fluid provided to the axial bore may be propelled out of the jet port.

10. The screw feeder of claim 1, wherein the screw includes a thread that defines a thread plane, and wherein the jet port includes a central axis operably forming an angle ranging from about 5° to about 20° to the thread plane.

11. The screw feeder of claim 1, wherein a volume of fluid is provided to the jet port such that the volume of fluid exits the jet port at a super-sonic velocity.

12. The screw feeder of claim 1, wherein an outlet port pressure is at least 0.069 MPa higher than an inlet port pressure.

13. A screw feeder operable to transport a particulate material from a low pressure to a high pressure environment, comprising:

a housing to contain the material while it is within the screw feeder, the housing defining an inlet port and an outlet port;

a screw rotatably disposed within the housing to advance the material from the inlet port to the outlet port, and adapted to rotate axially;

a labyrinth seal formed around and in communication with the screw to substantially eliminate reverse movement of the material; and a cooling medium delivery device connectable to the screw feeder operable to direct a cooling medium into contact with at least a portion of the screw feeder;

wherein a pressure differential between the inlet port to the outlet port is at least 0.069 MPad.

14. The screw feeder of claim 13, further comprising:

a sleeve having an interior and an exterior substantially surrounding a length of the screw; and a thread extending from the screw;

wherein the interior defines a groove operably cooperating with the thread to form the labyrinth seal.

15. The screw feeder of claim 14, wherein the screw is adapted to rotate axially in a first direction.

16. The screw feeder of claim 15, comprising:

a motor;

a screw gear operably interconnecting the motor and the screw to rotate the screw in the first direction; and a sleeve gear operably interconnecting the motor and the sleeve to rotate the sleeve in a second direction;

wherein the motor drives the screw gear and the sleeve gear at substantially the same rotational speed.

17. The screw feeder of claim 13, further comprising an assistor, to operably assist the screw in advancing the material from the inlet port to the outlet port.

18. The screw feeder of claim 13, wherein the assistor includes a jet port;

wherein the screw defines an axial bore and a radial bore; and wherein the radial bore operably interconnects the axial bore and the jet port, such that a fluid provided to the axial bore may be propelled out of the jet port.

19. The screw feeder of claim 18, wherein the labyrinth seal substantially inhibits a flow of the fluid and the particulate material from the outlet port to the inlet port of the housing.

20. The screw feeder of claim 18, wherein the screw includes a thread defining a thread plane, and wherein the assistor includes a central axis operably formed at an angle ranging between about 2° to about 25° to the thread plane.

21. The screw feeder of claim 19, wherein a volume of fluid is provided to said assistor such that said volume of fluid exits the jet to operably assist transport of the particulate material.

22. The screw feeder of claim 14, wherein at least the screw and the sleeve comprise a ceramic material.

23. The screw feeder of claim 13, wherein the cooling medium delivery device comprises a jacket connectable to the housing operable to receive the cooling medium.

24. A method for transporting a high temperature particulate material using a screw pump, the screw pump including a screw, and a housing, the method comprising:

rotatably mounting the screw within the housing;

feeding the particulate material at an elevated temperature into the housing to operably contact the screw;

axially rotating the screw to operably advance the particulate material;

creating a labyrinth seal around and in communication with the screw to substantially eliminate reverse movement of the material;

directing a cooling flow to the screw pump; and generating at least a 0.069 MPad differential pressure across the screw pump.

25. The method of claim 24, comprising constructing at least the screw and the housing of a ceramic material.

26. The method of claim 24, comprising constructing at least the screw and the housing of a high temperature compatible metal material.

27. The method of claim 24, comprising injecting a fluid through the screw into the particulate material to reduce clogging of the particulate material.

28. The method of claim 27, comprising injecting one of a carbon dioxide gas and a steam through the screw.

29. The method of claim 27, comprising creating a bore within the screw to operably receive the fluid.

30. The method of claim 24, comprising connecting the screw pump to a source of cooling medium.

31. The method of claim 24, comprising rotating the screw at a rotational speed ranging between approximately 3,600 rpm to 20,000 rpm.

32. The method of claim 24, comprising surrounding at least a portion of the screw with a non-rotating sleeve adjacent to a location where the particulate material is fed into the housing.

33. The method of claim 24, comprising sealing a rotating portion of the screw.

34. The method of claim 24, comprising rotatably supporting the screw using at least a set of bearings.

* * * * *